United States Patent
Dunn et al.

(10) Patent No.: US 7,159,687 B2
(45) Date of Patent: Jan. 9, 2007

(54) TRACTOR WITH REVERSIBLE OPERATOR POSITION FOR OPERATION AND TRANSPORT

(75) Inventors: James Thomas Dunn, Winnipeg (CA);
Don MacGregor, Winnipeg (CA);
Brent Gabriel, Winnipeg (CA);
Leonard Bergman, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 51 days.

(21) Appl. No.: 11/116,418

(22) Filed: Apr. 28, 2005

(65) Prior Publication Data

US 2006/0201732 A1    Sep. 14, 2006

Related U.S. Application Data

(60) Provisional application No. 60/659,076, filed on Mar. 8, 2005.

(30) Foreign Application Priority Data

Apr. 27, 2005    (CA) .................................... 2505458

(51) Int. Cl.
*B60K 26/00* (2006.01)
(52) U.S. Cl. .................... 180/329; 180/334; 180/326
(58) Field of Classification Search ............. 180/315, 180/53.4, 326, 329; 701/50
See application file for complete search history.

(56) References Cited

U.S. PATENT DOCUMENTS

| | | | | |
|---|---|---|---|---|
| 4,278,144 A * | 7/1981 | Perin | ........................ | 180/329 |
| 4,392,546 A * | 7/1983 | Brown et al. | ............... | 180/326 |
| 5,052,512 A * | 10/1991 | Pakosh et al. | ............. | 180/329 |
| 5,086,869 A * | 2/1992 | Newbery et al. | .......... | 180/329 |
| 5,664,909 A * | 9/1997 | Lindgren et al. | ......... | 404/122 |
| 6,034,599 A * | 3/2000 | Beacom | ..................... | 340/475 |
| 6,092,757 A * | 7/2000 | Leytem | ..................... | 242/593 |
| 6,814,174 B1 * | 11/2004 | Fluent et al. | ............... | 180/329 |
| 2003/0019196 A1 * | 1/2003 | Coers et al. | ........... | 56/10.2 G |

* cited by examiner

*Primary Examiner*—Paul N. Dickson
*Assistant Examiner*—Tiffany L. Webb
(74) *Attorney, Agent, or Firm*—Adrian D. Battison; Michael R. Williams; Ryan W. Dupuis

(57) ABSTRACT

A tractor has hydraulically driven wheels at a cab end and castor wheels at an engine end. It can be driven cab forward in a working mode with a header on the forward end. It is rotated to engine forward in the transport position for more stable higher speed travel. The driver's console is rotated in the cab with the steering and speed control elements moved with the seat for the driver to face forwards and its position is detected by switches. In the engine forward position for transportation, the control system detects the seat position and operates the controls for higher speed drive and to prevent operation of the header. A vehicle emblem SMV is located on the back of the driver's seat so that it is visible to a person behind regardless of the direction of travel.

11 Claims, 7 Drawing Sheets

TRACTOR WITH REVERSIBLE OPERATOR POSITION FOR OPERATION AND TRANSPORT

This application claims priority under 35 U.S.C. 119 from provisional application Ser. No. 60/659,076 filed Mar. 8th, 2005.

This application is related to application Ser. No. 11/116,417 filed simultaneously with this application by the same assignee, the disclosure of which is incorporated herein by reference.

This invention relates to a tractor of the type commonly used as a swather tractor which is supported on a pair of hydraulically drive wheels and a pair of castor wheels in which the operators seat and operating console can be rotated about a vertical axis to two opposed positions for cab forward and engine forward operation.

BACKGROUND OF THE INVENTION

Hydrostatically steered vehicles have been around for many years and their application to windrowers has been significant. There has been a limit to the transport speed of these windrowers due to instability at high speed with the drive wheels ahead of the castor wheels (cab forward). Higher speeds on the road allow the user to cover large distances without the use of trailers and tow vehicles. It has been found that if the machine travels with the castor wheels leading the drive wheels (engine forward), the machine is much more stable and higher speeds are possible.

While in a turn with a self propelled machine that has the steered wheels leading, the centrifugal force at the center of gravity is such that it tends to assist the rear driving wheels in straightening out the machine. On the other hand when in a turn with a self propelled machine that has the driving wheels leading, the centrifugal force at the center of gravity is such that it encourages the turn, and the front driving wheel must overcome this force in order to straighten out the machine. Thus the machine is more stable, or wants to travel more in a straight line, when the steered wheels are leading and the driving wheel are trailing.

Other bi-directional vehicles such as the Ford TV140, although hydrostatically driven, are not hydrostatically steered. The TV140 machine relies on the pivoting action between front and rear sections of the tractor to steer. Control of the TV140 machine is done using hydraulic valving and cylinders.

Coop Implements manufactured the model 742 windrower tractor which is bi-directional. This was done to allow the header to be detached and connected at the drive wheel end of the tractor. This also provided weight to the drive wheels to make the machine more controllable during transport. However, the purpose for traveling in the engine forward direction was not to be able to increase transport speed, as the machine traveled only 12 mph, the same as it would have in cab forward direction. Also, the controls were not mounted on the seat base, so they had to be operated with the left hand instead of the right as would normally be the case in cab forward direction.

SUMMARY OF THE INVENTION

It is one object of the invention to provide an improved tractor of the type for transporting a header which allows improved operation in a transport position.

According to one aspect of the invention there is provided a tractor comprising:

a tractor frame;

an engine mounted on the tractor frame;

at least one hydraulic pump driven by the engine for generating a source of hydraulic fluid under pressure for driving components of the tractor and components attached to the tractor;

a cab mounted on the tractor frame;

two driven wheels of the tractor mounted at a driven end of the tractor;

two non-driven castor wheels of the tractor mounted at a second end of the tractor;

the cab being mounted on the frame at the driven end;

the driven end having mounting assemblies for supporting a crop cutting header at a position in front of the driven end and in front of the cab when the driven end is forwards;

the engine being located between the cab and the second end of the frame;

an operator's seat and control assembly;

the operator's seat and control assembly including an operator's seat on which an operator can sit and a control system manually operable while the operator is seated in the seat;

the control system including a steering control, a speed control and a header control;

the operator's seat and control assembly being mounted as a unit within the cab and being rotatable as a unit in the cab from a cab forward position in which the operator's seat faces the driven end of the frame to an engine forward position in which the operator's seat faces the second end with the engine in front of the operator's seat;

the operator's seat and control assembly being arranged to rotate as a unit such that the control system is arranged at the same locations and operating positions relative to the operator's seat in both the cab forward and engine forward positions;

each of the driven wheels including a respective drive motor driven by hydraulic fluid from the at least one hydraulic pump;

the speed control being arranged to control a rate of supply of hydraulic fluid from the at least one hydraulic pump to the respective drive motors to control a common speed of rotation of the driven wheels and thus a speed of movement of the tractor;

the steering control being arranged to control a differential in rate of supply of hydraulic fluid from the at least one hydraulic pump to the respective drive motors to control a relative speed of rotation of the driven wheels and thus a turning direction of the tractor;

the control system being responsive to movement of the operator's seat and control assembly between the engine forward position and the cab forward position to change operation of at least one of the steering control, speed control and header control.

In accordance with one important feature, the operation the speed control is changed such that the driven wheels can rotate at higher speed to drive the tractor at higher ground speed when the operator's seat and control assembly is in the engine forward position.

In accordance with another important feature, the drive motor to the driven wheels has a higher drive range which can be accessed only when the operator's seat and control assembly is in the engine forward position.

In accordance with another important feature, the drive motor has a low speed range in the cab forward position and the low speed range and a high speed range in the engine forward position.

In accordance with another important feature, the different speed ranges are obtained by adjusting a cam plate of the drive motor.

In accordance with another important feature, the drive motor has one low speed range and one intermediate speed range in the cab forward position and has the low speed range, and a high speed range in the engine forward position.

In accordance with another important feature, the control system is responsive to movement of the operator's seat and control assembly between the engine forward position and the cab forward position by providing switches on the operator's seat and control assembly which are actuated in the cab forward position and engine forward positions respectively. This also can be used to ensure that the tractor is only operable when the operator's seat and control assembly is properly and fixedly located in the required position for safety of operation. However other techniques for detecting when the operator's seat and control assembly is moved between the two positions can be provided.

In accordance with another important feature, the control system includes a turn signal operating switch for actuating turn signals on the tractor and wherein the control system is responsive to the movement to operate the turn signals only when the operator's seat and control assembly is in the engine forward position.

In accordance with another important feature, the header control includes a header speed control operable to control drive speed of a header drive motor and wherein the header speed control can only be actuated when the operator's seat and control assembly is in the cab forward position.

In accordance with another important feature, the header control includes a header height control operable to allow the header to fall from a raised position to a cut height and wherein the header height control can only be actuated to allow the header to fall from a raised position to a cut height when the operator's seat and control assembly is in the cab forward position.

According to a second aspect of the invention there is provided a tractor comprising:

a tractor frame;

an engine mounted on the tractor frame;

at least one hydraulic pump driven by the engine for generating a source of hydraulic fluid under pressure for driving components of the tractor and components attached to the tractor;

a cab mounted on the tractor frame;

two driven wheels of the tractor mounted at a driven end of the tractor;

two non-driven castor wheels of the tractor mounted at a second end of the tractor;

the cab being mounted on the frame at the driven end;

the driven end having mounting assemblies for supporting a crop cutting header at a position in front of the driven end and in front of the cab when the driven end is forwards;

the engine being located between the cab and the second end of the frame;

an operator's seat and control assembly;

the operator's seat and control assembly including an operator's seat on which an operator can sit and a control system manually operable while the operator is seated in the seat;

the control system including a steering control and a speed control;

the operator's seat and control assembly being mounted as a unit within the cab and being rotatable as a unit in the cab from a cab forward position in which the operator's seat faces the driven end of the frame to an engine forward position in which the operator's seat faces the second end with the engine in front of the operator's seat;

the operator's seat and control assembly being arranged to rotate as a unit such that the control system is arranged at the same locations and operating positions relative to the operator's seat in both the cab forward and engine forward positions;

each of the driven wheels including a respective drive motor driven by hydraulic fluid from the at least one hydraulic pump;

the speed control being arranged to control a rate of supply of hydraulic fluid from the at least one hydraulic pump to the respective drive motors to control a common speed of rotation of the driven wheels and thus a speed of movement of the tractor;

the steering control being arranged to control a differential in rate of supply of hydraulic fluid from the at least one hydraulic pump to the respective drive motors to control a relative speed of rotation of the driven wheels and thus a turning direction of the tractor;

there being provided an SMV (slow moving vehicle emblem) attached to a rear of the operator's seat so as to be presented at the rear of the tractor when in the cab forward position and the engine forward position.

We address the operator control issue and provide a mechanical steering linkage and mechanical (servo assisted) speed control system that appears identical to the operator regardless of the direction of travel. The system consists of a steering and speed control mechanisms that are linked together in such a way that the operator always uses the same hand to control the speed of the machine and always moves the speed control lever in the direction of desired travel.

In order for the operator to turn the seat base around, the machine must be in neutral so that the speed linkage pivot is directly above the seat base pivot. In this way the entire control system rotates around this center pivot and once the seat base is rotated around, the controls then match the direction of travel.

To maximize safety and functionality, our invention builds many features into the machine that may or may not be locked out depending on which directional the operator is facing. Switches on the seat base detect which direction the operator's station is in.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
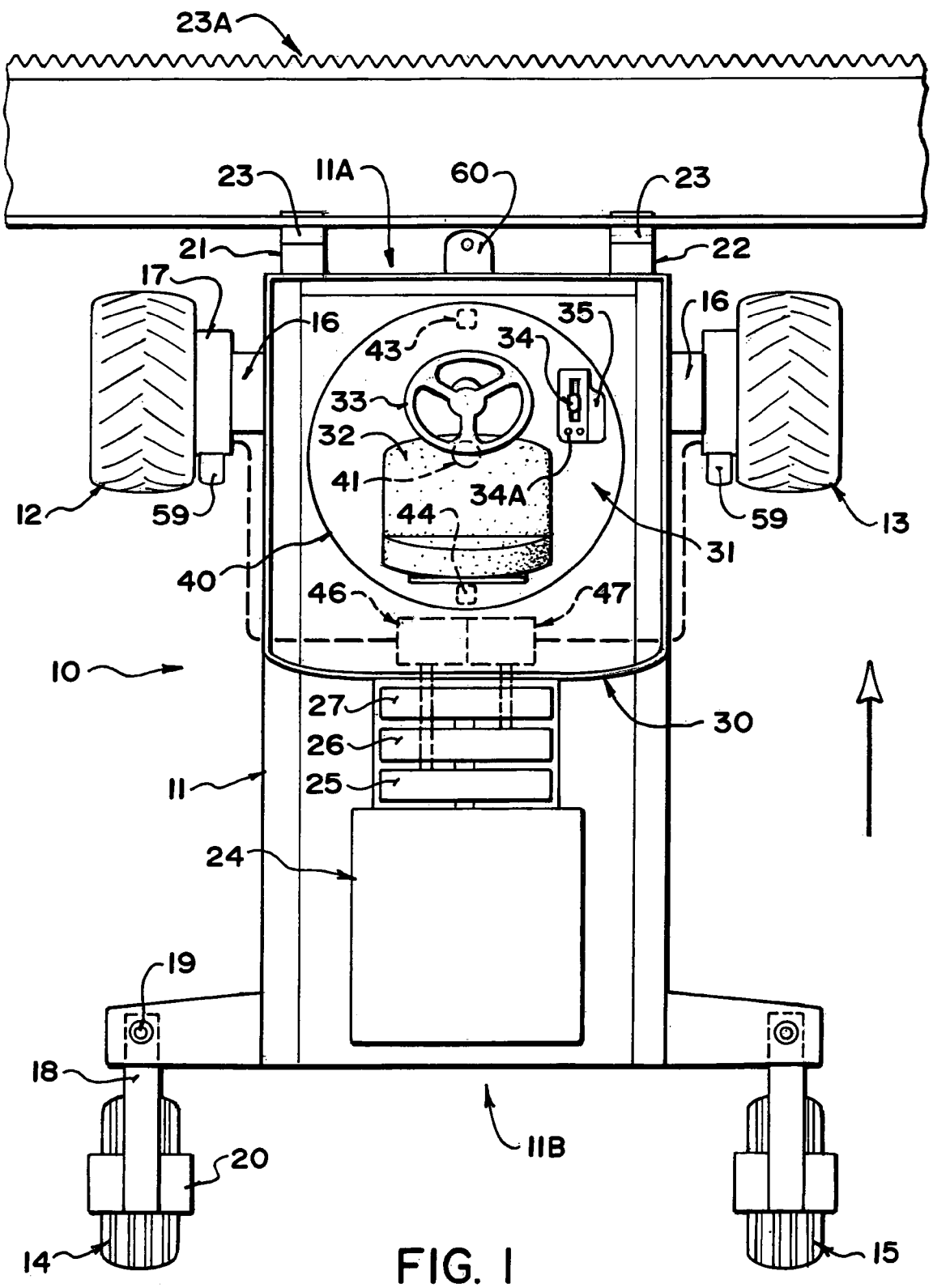
FIG. 1 is a top plan view partly in phantom and partly broken away showing a tractor according to the present invention in the cab forward position.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal.

Many of the above components are well known and conventional and can be found in many different designs of such tractors manufactured by a number of manufacturers including the present assignee. Further details of the reel speed control and reel location control are disclosed in the above co-pending application to which reference may be made filed simultaneously with this application.

Figure 2:
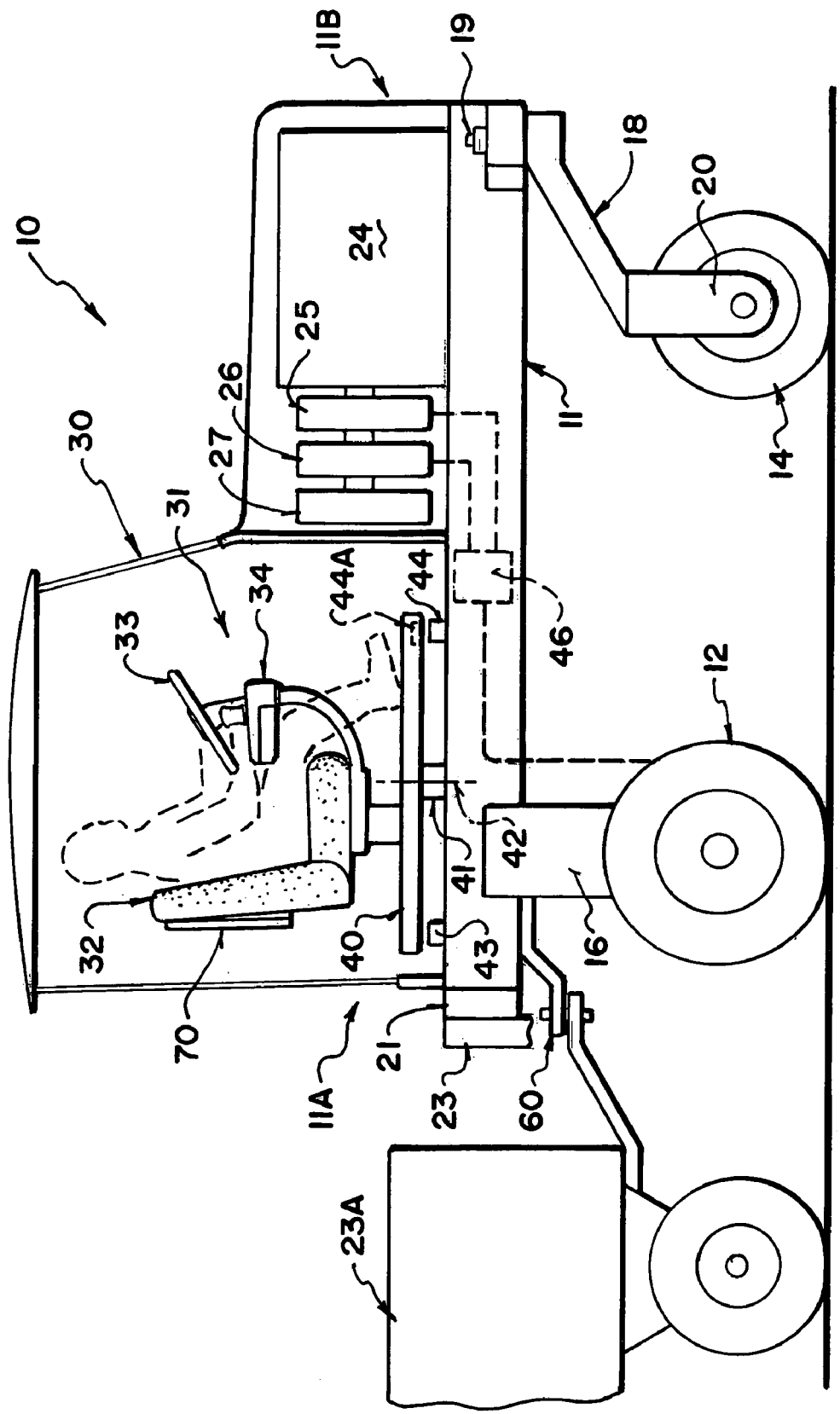
FIG. 2 is a side elevational view of the tractor of FIG. 1 in which the operators seat and console have been rotated for operating the tractor in an engine forward position.
Figure 3:
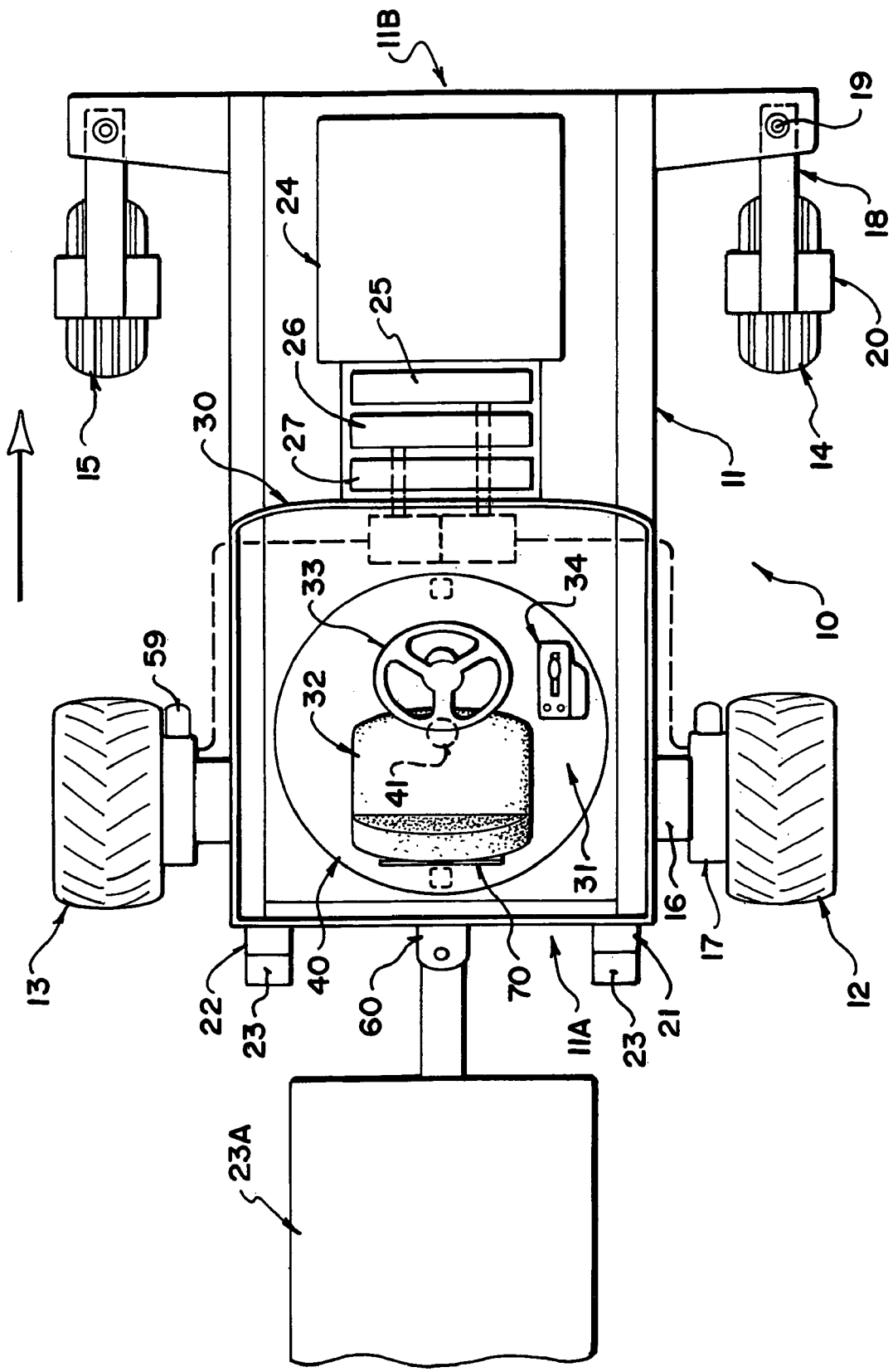
FIG. 3 is a top plan view similar to that of FIG. 1 showing the tractor in the engine forward position.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIGS. 2 and 3 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 45 carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab or position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical connections as will be apparent to one skilled in the art.

Figure 4:
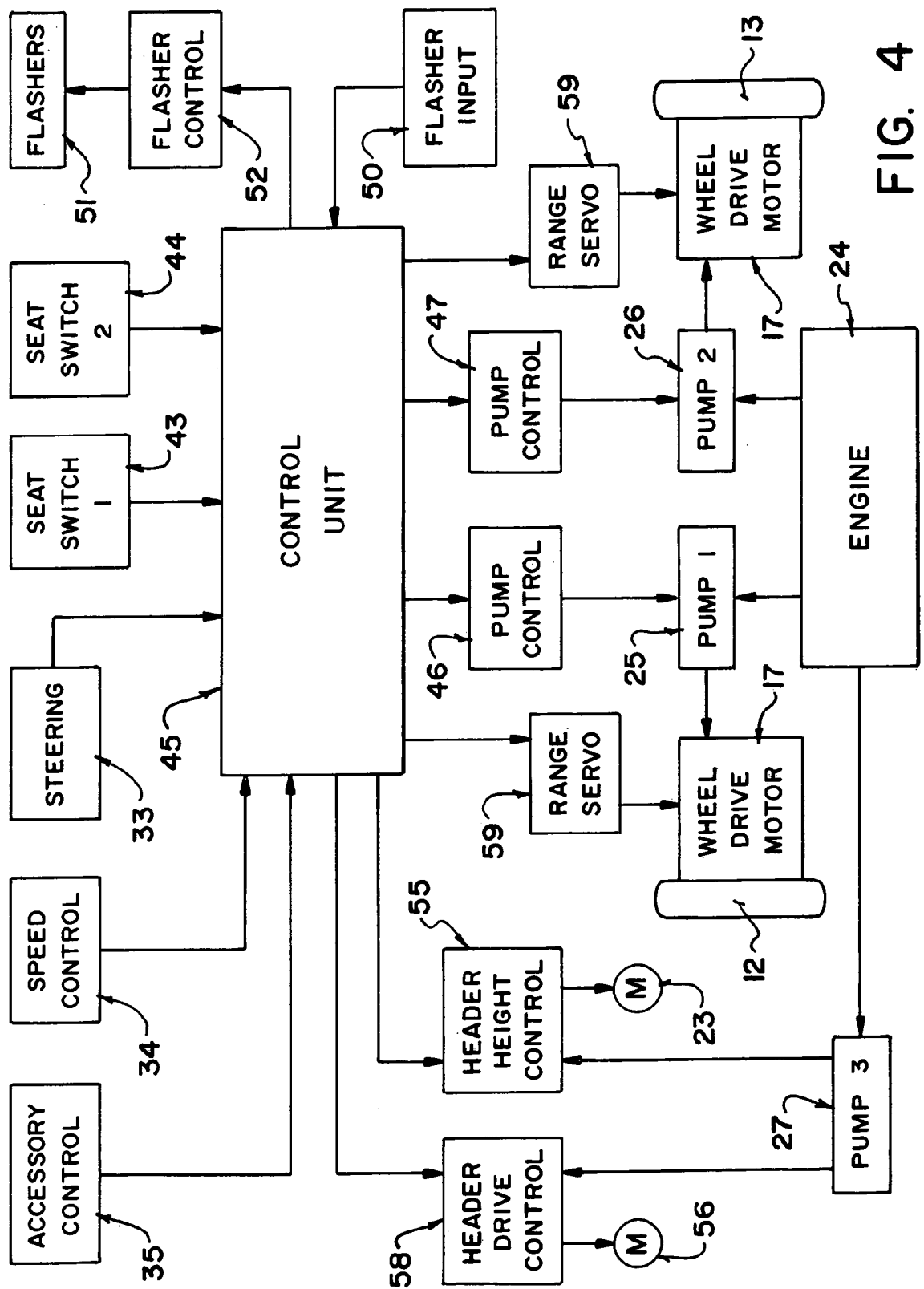
FIG. 4 is a schematic illustration of the control system for the tractor.

Turning now to the mechanical section as shown in FIG. 1 and the schematic control system as shown in FIG. 4. The speed control system 34 supplies signals to a control unit 45 which controls the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determine by the control of the pumps 25 and 26.

In addition the steering 33 supplies control signals to the control unit 45 which also acts to control the pumps 25 and 26 to generate a differential in the flow thereof so as to generate a differential in the speed of the motors 17. In the schematic illustration of a system shown in FIG. 4, this operation is effected by a control unit 45 which is responsive to the signal from the steering and from the speed control and thus selects the positions of the pumps accordingly. However it is also possible to provide a system in which this is effected mechanically by providing two separate inputs to the pump control arrangement to provide a required speed and then a differential between the two pump controls. Yet further this arrangement can be effected by valving the flow from the pumps 25 and 26 so as to transfer some flow from one to the other to provide the differential. Yet further the arrangement can be provided by a single pump and by valving the flow from the single pump to the drive motors 17 at the same rate or at a differential rate as required. All these systems are available and known to the person skilled in this art. The selection of which system to use depend upon various parameters well known to the person skilled in the art.

As shown in FIG. 4 the control unit 45 is also responsive to input from the seat switch sensors 43 and 44 so that operation of the systems shown in FIG. 4 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation.

In addition to the basic control of the movement of the vehicle, the control unit also provides outputs for controlling other elements of the tractor. In a first element the control console includes a conventional flasher input lever indicated at 50 by which the operator can operate turn signals or four way flashers as indicated by the flashing lights 51. The control unit is arranged so that the four flashers indicated at 51 can be operated simultaneously by the flasher control 52 in both positions of cab forward and engine forward described previously. However, as it is intended that primary mode of high speed transportation of the tractor is in the engine forward position, the turn signals are operated by the flasher control 52 so that the turn signals will only operate when the operator console and tractor are arranged in the engine forward position as detected by the respective seat switch.

The header drive system including the height control cylinders 23 actuated by a control system 55 is driven with fluid from the pump 27 also driven by the engine 24. The pump also supplies fluid to a motor 56 which drives the operation of the header. This drive can comprise a single motor driving all the components of the header including the cutting knife, the reel and any collection system including drapers and/or augers. However individual motors and individual controls can be provided.

The control unit 45 is arranged, in response to operation of the seat switch indicating that the operator console is in the cab forward position acts to allow actuation of the motor 56 through the drive control 58. When the seat is out of that position and particularly turned to the engine forward position, actuation of the header is prevented.

The height control 55 is arranged to provide adjustment of the height of cutting action and also to provide a raised position away from the cutting action. The control unit 45 is arranged to control the header/height control 55 so that the header is maintained in the raised inoperative position and cannot fall under automatic control to the cutting position.

The drive motors 17 also include adjustment by a servo unit 59 which selects different ranges for the motor. This is obtained by adjusting the cam plate of the motor to different displacement positions as is well known to one skilled in the art.

In one embodiment the drive motors 17 are arranged to have two different ranges that is a low speed range and a higher speed range. It is of course appreciated that the low speed range provides higher torque.

The control unit is arranged such that the high speed range can only be accessed when the operator console is in the engine forward position and thus cannot be accessed when the operator console is in the cab forward position. In this arrangement when the operator operates essentially one of the switches 35 to select one or other of the ranges, in the situation where the operator console is in the cab forward position, the system indicates to the operator that the high range cannot be accessed. In this way the intention is that the tractor can travel at significantly higher speeds in the engine forward position and is restricted to the lower speeds when in the cab forward position, bearing in mind that the tractor is unstable at the higher speeds when in the cab forward position.

In an alternative arrangement a three range motor can be provided with low, intermediate and high ranges accessible. In this arrangement the low and intermediate ranges are accessible in the cab forward position and the low and high ranges are accessible in the engine forward position. In the engine forward position the low ranges available for high torque and the high ranges are available for high speed. In the cab forward position the intermediate range is available for higher speed operation in the field.

In transportation, it is intended therefore that the operator's console is moved to the engine forward position and that the tractor moves forward rapidly at high speed in the transport position at a speed significantly higher than can be achieved in current tractors of this type. When the header is of a relatively narrow width, this header can remain in place and is simply carried behind the tractor. In a situation where the header is of significant width greater than can be accommodated in a road width, the header is disconnected from the supports 21 and 22 and is instead trailed on wheels attached to a hitch 60 at the end 11A of the tractor.

Figure 5:
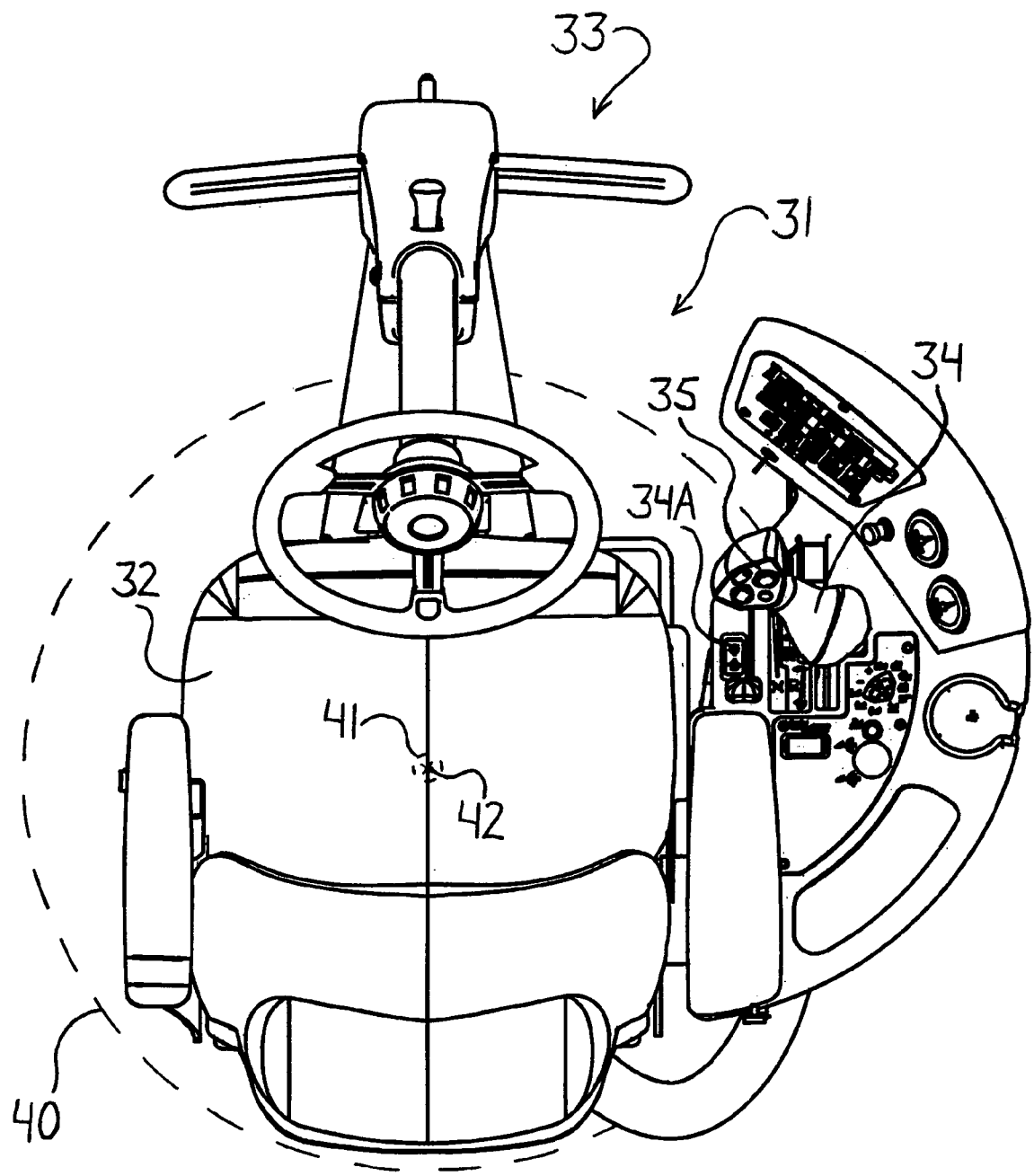
FIG. 5 is a top plan view on an enlarged scale showing the operator's console.

The operator's console is shown in enlarged scale in FIG. 5 showing further details of the various operating systems.

Figure 6:
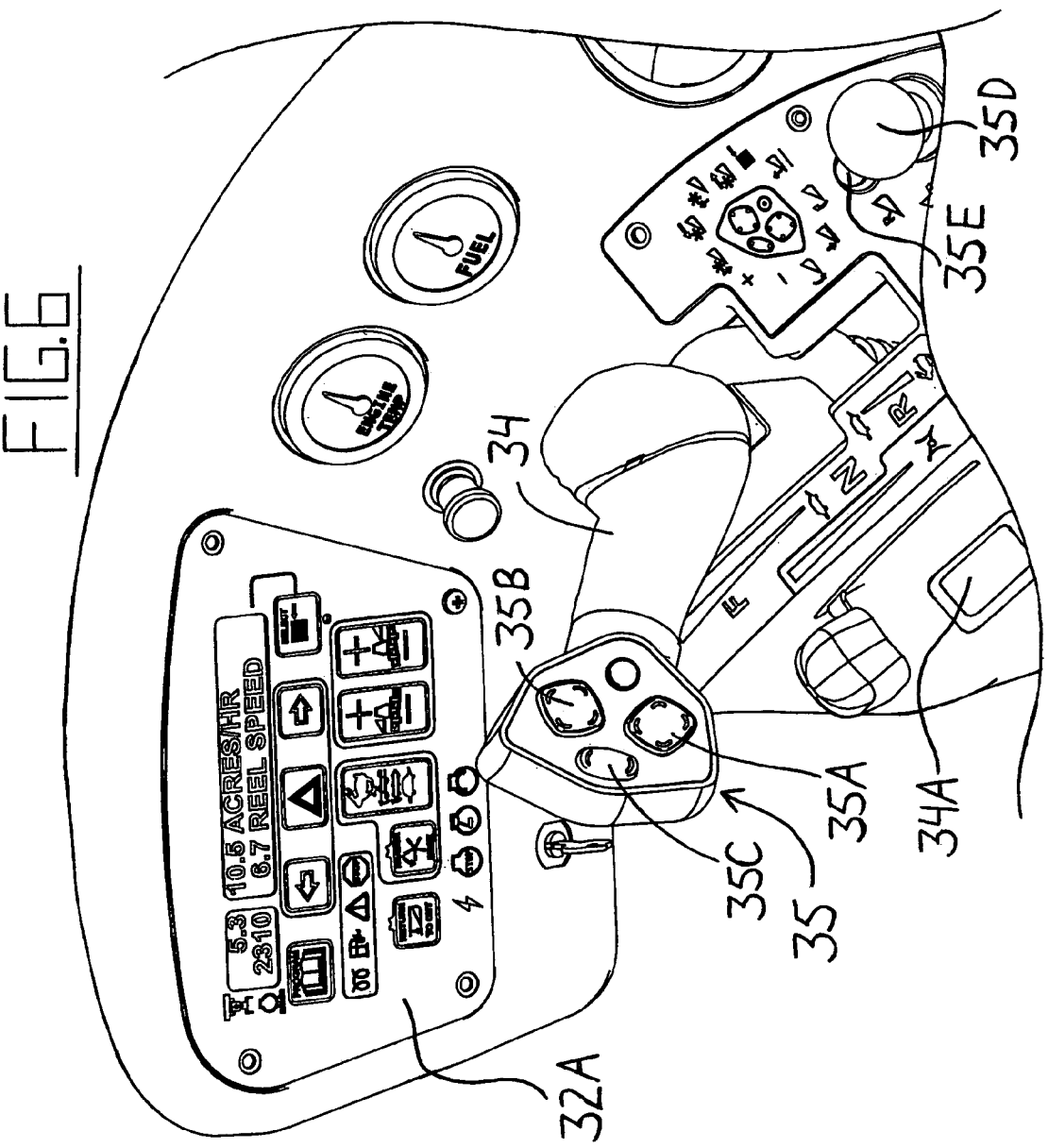
FIG. 6 is a top plan view on an enlarged scale of the control elements of the console of FIG. 5.
Figure 7:
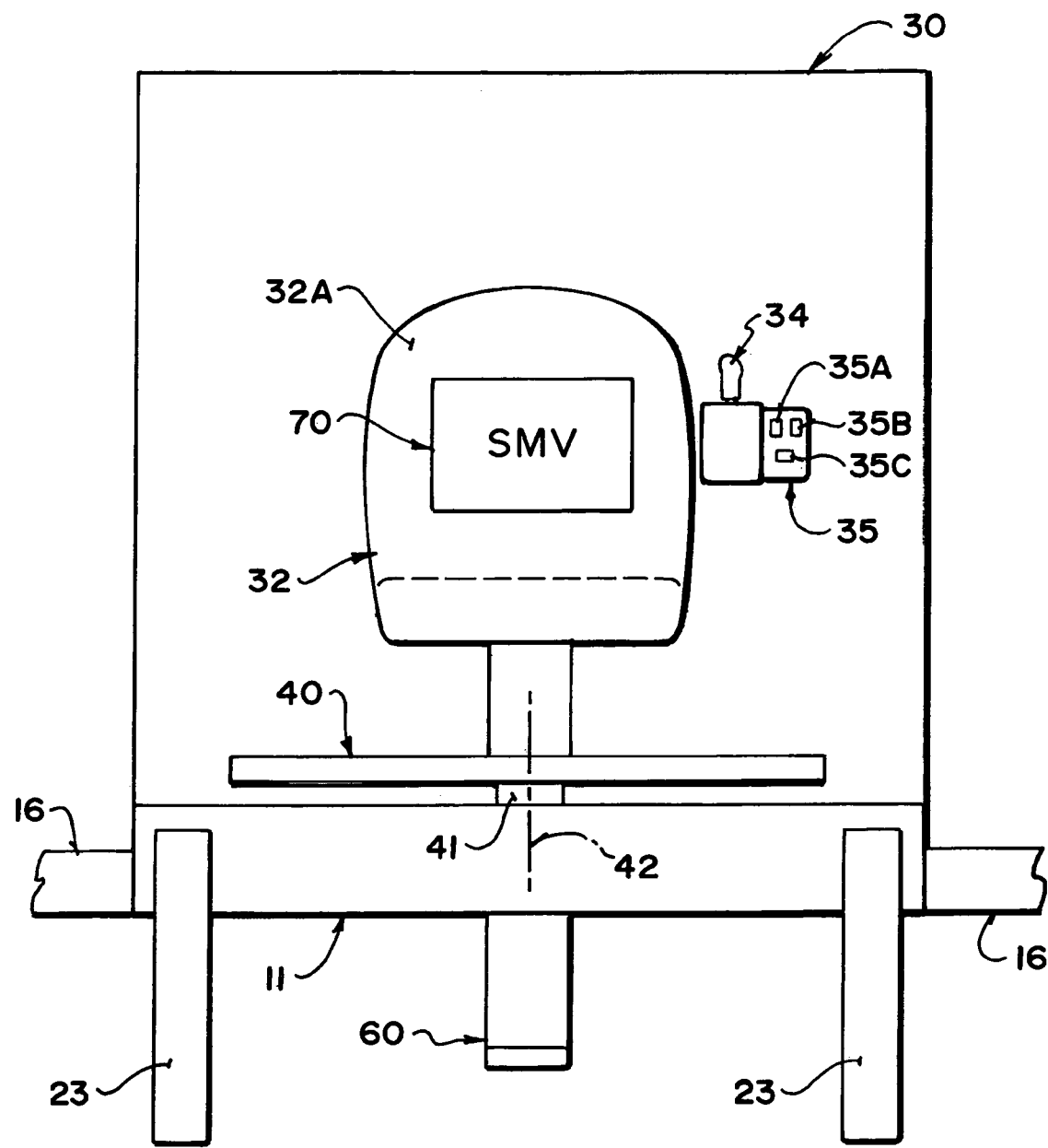
FIG. 7 is a rear elevation on an enlarged scale showing the tractor in the engine forward position of FIG. 3.

In FIG. 6 there is a rear view of the operator console and it will be noted that the back of the seat as indicated at 32A carries the conventional SVM as indicated at 70 so that this is visible through the rear of the vehicle independent of the direction in which the vehicle is travelling. Thus in the engine forward position the SVM components are readily visible through the rear of the cab. In the cab forward position, the SVM is visible over the engine. In this way the SVM systems used primarily for road transport are visible primarily in the engine forward position.

Narrower headers are left on the windrower tractor for transport whereas wider headers need to be removed and towed endwise to make a narrow safe transport package. The traction motor speed is determined by its displacement depending on swash plate position, which is controlled by a servo. The ranges are accomplished by different swash plate positions, default spring load to low speed for 2-speed machines and center position for 3-speed machines. Hydraulic pressure from a valve shifts the servo into high (and low range for 3-speed machines). The three speed feature on the motor was developed by our motor supplier at our request and is the first time hydrostatic 3-speed ranges are used on a windrower application. Windrower tractors fall into two categories:

Two speed windrowers—These machines have two speed ranges when in the engine forward position and only one speed range (low speed) in the cab forward position. Speed ranges are selectable by a single two-position switch with a computer determining the switch logic such that when high range is chosen in cab forward position the computer indicates that this speed range is not available.

Three speed windrowers—Three ground speed ranges are selectable by a single two-position switch with a computer determining the switch logic. Low & medium ranges are available in cab forward position and low & high ranges are available in the engine forward position. Low speed provides high wheel tractive effort to climb hills and trailers. The mid speed provides increased speed to cut crops that the new disc header is capable of handling. The high speed reduces time to get from field to field.

The lighting and marking is set up comply to ASAE standard S279 when the windrower is driven in the engine forward direction. Although the 4-way flashers work in both engine or cab forward directions, the turn signals work only in the engine forward direction.

The slow moving vehicle emblem which is known as the SMV is established under ASAE standard S277 and is required on all vehicles of this type. This emblem is required in addition to conventional lights and turn signals to inform road users of the slow moving nature of the vehicle concerned.

In this arrangement, the SMV is attached to the rear of the operator's seat so that when the operator's station is in the engine forward position the SMV on the back of the seat is exposed through the window to traffic approaching from the rear of the windrower. When a draper header is left attached for transport the large diameter reel tends to obscure visibility of the SMV. In this case an optional SMV secured to a freestanding bracket can be temporarily inserted in a socket on the rear of the seat to provide a high enough position for the SMV to be visible over the reel. The SMV remains clean as it is not exposed to the outside environment.

In field operation (operator's station in cab forward position), the windrower has a feature that allows the header to drop to a predetermined desired cut height by just momentarily depressing the down side of the header height switch. This feature is known as return-to-cut-height and is locked out by the computer when the operator is in the engine forward position so that unexpected (or unobserved by the operator) lowering of the header does not occur.

Header engagement (forward or reverse) will not be possible when the operator's station is facing the engine.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A tractor comprising:
   a tractor frame;
   an engine mounted on the tractor frame;
   at least one hydraulic pump driven by the engine for generating a source of hydraulic fluid under pressure for driving components of the tractor and components attached to the tractor;
   a cab mounted on the tractor frame;
   two driven wheels of the tractor mounted at a driven end of the tractor;
   two non-driven castor wheels of the tractor mounted at a second end of the tractor;
   the cab being mounted on the frame at the driven end;
   the driven end having mounting assemblies for supporting a crop cutting header at a position in front of the driven end and in front of the cab when the driven end is forwards;
   the engine being located between the cab and the second end of the frame;
   an operator's seat and control assembly;
   the operator's seat and control assembly including an operator's seat on which an operator can sit and a control system manually operable while the operator is seated in the seat;
   the control system including a steering control, a speed control and a header control;
   the operator's seat and control assembly being mounted as a unit within the cab and being rotatable as a unit in the cab from a cab forward position in which the operator's seat faces the driven end of the frame to an engine forward position in which the operator's seat faces the second end with the engine in front of the operator's seat;
   the operator's seat and control assembly being arranged to rotate as a unit such that the control system is arranged at the same locations and operating positions relative to the operator's seat in both the cab forward and engine forward positions;
   each of the driven wheels including a respective drive motor driven by hydraulic fluid from the at least one hydraulic pump;
   the speed control being arranged to control a rate of supply of hydraulic fluid from the at least one hydraulic pump to the respective drive motors to control a common speed of rotation of the driven wheels and thus a speed of movement of the tractor;
   the steering control being arranged to control a differential in rate of supply of hydraulic fluid from the at least one hydraulic pump to the respective drive motors to control a relative speed of rotation of the driven wheels and thus a turning direction of the tractor;

the control system being responsive to movement of the operator's seat and control assembly between the engine forward position and the cab forward position to change operation of at least one of the steering control, speed control and header control.

2. The tractor according to claim 1 wherein the operation the speed control is changed such that the driven wheels can rotate at higher speed to drive the tractor at higher ground speed when the operator's seat and control assembly is in the engine forward position.

3. The tractor according to claim 2 wherein the drive motor to the driven wheels has a higher drive range which can be accessed only when the operator's seat and control assembly is in the engine forward position.

4. The tractor according to claim 3 wherein the different speed ranges are obtained by adjusting a cam plate of the drive motor.

5. The tractor according to claim 2 wherein the drive motor has a low speed range in the cab forward position and the low speed range and a high speed range in the engine forward position.

6. The tractor according to claim 2 wherein the drive motor has one low speed range and one intermediate speed range in the cab forward position and has the low speed range, and a high speed range in the engine forward position.

7. The tractor according to claim 1 wherein the control system is responsive to movement of the operator's seat and control assembly between the engine forward position and the cab forward position by providing switches on the operator's seat and control assembly which are actuated in the cab forward position and engine forward positions respectively.

8. The tractor according to claim 1 wherein the control system includes a turn signal operating switch for actuating turn signals on the tractor and wherein the control system is responsive to the movement to operate the turn signals only when the operator's seat and control assembly is in the engine forward position.

9. The tractor according to claim 1 wherein the header control includes a header speed control operable to control drive speed of a header drive motor and wherein the header speed control can only be actuated when the operator's seat and control assembly is in the cab forward position.

10. The tractor according to claim 1 wherein the header control includes a header height control operable to allow the header to fall from a raised position to a cut height and wherein the header height control can only be actuated to allow the header to fall from a raised position to a cut height when the operator's seat and control assembly is in the cab forward position.

11. A tractor comprising:

a tractor frame;

an engine mounted on the tractor frame;

at least one hydraulic pump driven by the engine for generating a source of hydraulic fluid under pressure for driving components of the tractor and components attached to the tractor;

a cab mounted on the tractor frame;

two driven wheels of the tractor mounted at a driven end of the tractor;

two non-driven castor wheels of the tractor mounted at a second end of the tractor;

the cab being mounted on the frame at the driven end;

the driven end having mounting assemblies for supporting a crop cutting header at a position in front of the driven end and in front of the cab when the driven end is forwards;

the engine being located between the cab and the second end of the frame;

an operator's seat and control assembly;

the operator's seat and control assembly including an operator's seat on which an operator can sit and a control system manually operable while the operator is seated in the seat;

the control system including a steering control and a speed control;

the operator's seat and control assembly being mounted as a unit within the cab and being rotatable as a unit in the cab from a cab forward position in which the operator's seat faces the driven end of the frame to an engine forward position in which the operator's seat faces the second end with the engine in front of the operator's seat;

the operator's seat and control assembly being arranged to rotate as a unit such that the control system is arranged at the same locations and operating positions relative to the operator's seat in both the cab forward and engine forward positions;

each of the driven wheels including a respective drive motor driven by hydraulic fluid from the at least one hydraulic pump;

the speed control being arranged to control a rate of supply of hydraulic fluid from the at least one hydraulic pump to the respective drive motors to control a common speed of rotation of the driven wheels and thus a speed of movement of the tractor;

the steering control being arranged to control a differential in rate of supply of hydraulic fluid from the at least one hydraulic pump to the respective drive motors to control a relative speed of rotation of the driven wheels and thus a turning direction of the tractor;

there being provided a slow moving vehicle emblem, SMV, attached to a rear of the operator's seat so as to be presented at the rear of the tractor when in the cab forward position and the engine forward position.

* * * * *